United States Patent [19]

Wakimoto et al.

[11] Patent Number: 4,901,247

[45] Date of Patent: Feb. 13, 1990

[54] METHOD FOR CONTROLLING AN OPERATION OF A BLAST FURNACE

[75] Inventors: Kazumasa Wakimoto; Motohiro Shibata; Takaharu Ishii; Masaaki Sakurai, all of Tokyo, Japan

[73] Assignee: Nippon Kokan Kabushiki Kaisha, Tokyo, Japan

[21] Appl. No.: 391,639

[22] Filed: Aug. 7, 1989

Related U.S. Application Data

[63] Continuation of Ser. No. 46,296, May 4, 1987, abandoned.

[30] Foreign Application Priority Data

May 20, 1986 [JP] Japan .................................. 61-113794

[51] Int. Cl.[4] .......................... G05B 23/02; C21B 5/00
[52] U.S. Cl. ...................................... 364/513; 364/477
[58] Field of Search .............................. 364/477, 513

[56] References Cited

U.S. PATENT DOCUMENTS

| | | | |
|---|---|---|---|
| 4,248,625 | 2/1981 | Tamura et al. | 75/41 |
| 4,740,886 | 4/1988 | Tanifuji et al. | 364/513 |

FOREIGN PATENT DOCUMENTS 142206 6/1985 United Kingdom .

OTHER PUBLICATIONS

Proceedings Iecon'84–1984, International Conference on Industrial Electronics, Control and Instrumentation, Tokyo, 22nd–26th Oct. 1984, vol. 2, pp. 883–888; M. Saito et al.; "An Automatic Diagnosing System for the Blast Furnace Operating Conditions", (whole document).

Patent Abstracts of Japan, vol. 8, No. 962 (C-235), 1599, 26th Jul. 1984; & JP-A-59 64 705 (Nippon Kokan K.K.), 12–04–1984.

*Primary Examiner*—Allen Macdonald
*Attorney, Agent, or Firm*—Frishauf, Holtz, Goodman & Woodward

[57] ABSTRACT

A method for operating a blast furnace by inferring the operating conditions in the blast furnace, on the basis of data supplied from sensors set in the blast furnace and also on the basis of the knowledge base formed by experience on the operation of the furnace by a small-scale computer and various processing units provided within the computer. Prior to the inference, the data from the sensors are processed by a large-scale computer and various processing units provided within the large-scale computer. The inference is performed by using certainty factor values, thereby making diagnosis of slip, hanging and channeling.

15 Claims, 5 Drawing Sheets

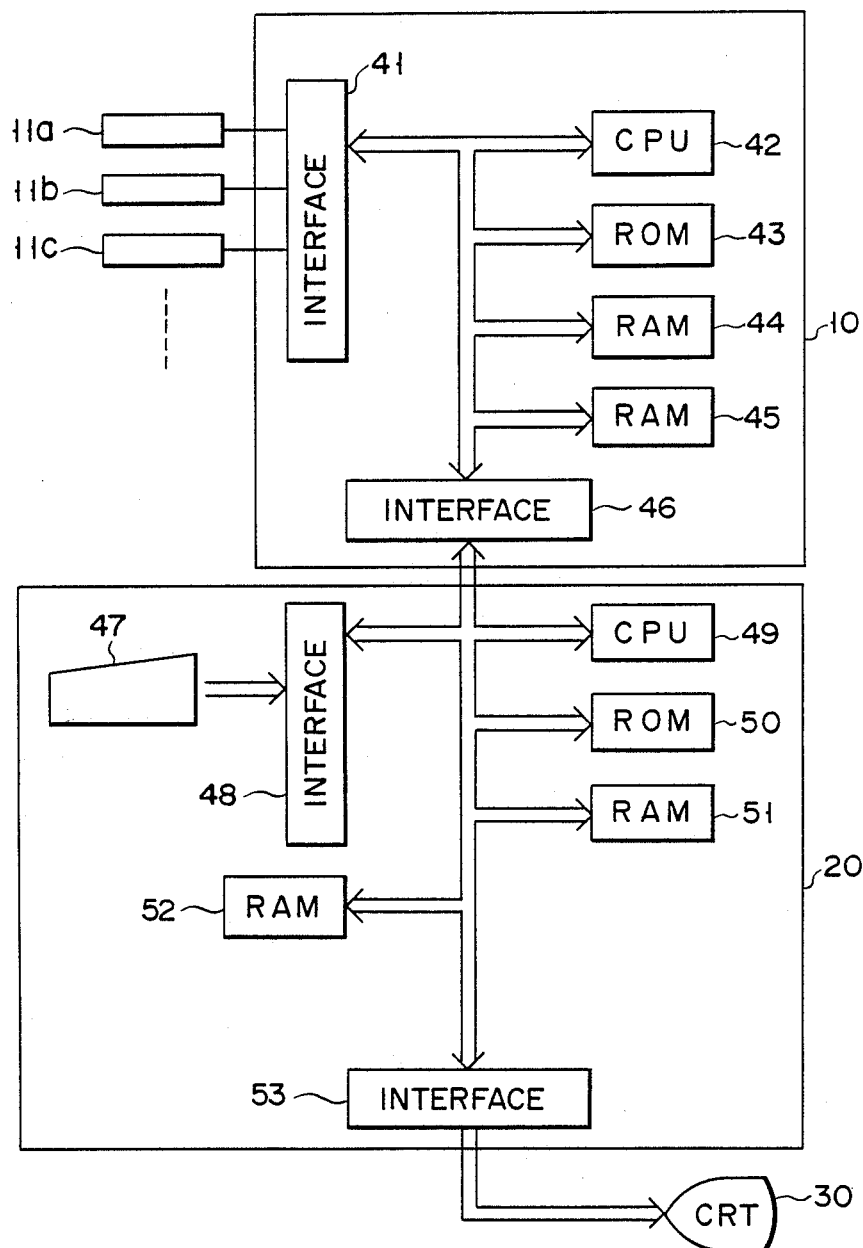
F I G. 2

METHOD FOR CONTROLLING AN OPERATION OF A BLAST FURNACE

This application is a Continuation, of application Ser. No. 07/046,296, filed May 4, 1987 now abandoned.

BACKGROUND OF THE INVENTION

The present invention relates to a method for controlling the operation of a blast furnace, and particularly to a method for diagnosing the furnace operating conditions, based on information output from sensor means provided in the blast furnace.

DESCRIPTION OF THE RELATED ART

In recent times, various methods have been proposed for the diagnosing and controlling of the operation of a blast furnace. Japanese Patent Disclosure (KOKAI) No. 84-64705, for example, describes a method wherein:

(a) factors, which are clearly known on the basis of accumulated experience, are derived from data output from various sensors;

(b) these factors are, in connection with the phenomena occurring in the furnace, arranged in order and numerically evaluated; and (c) from the factors thus arranged and evaluated in both a short and long term, the operating conditions of the furnace are detected.

This method, however, is disadvantageous in that it requires an analysis model to be maintained by means of modifications thereto in compliance with the changes the blast furnace undergoes throughout its life. Moreover, the modification itself is quite a time-consuming and complicated task, as the analysis model is quite complex.

SUMMARY OF THE INVENTION

It is an object of the present invention to provide a method for diagnosing a blast furnace operation, wherein an analysis model is easily modified in compliance with the change the blast furnace undergoes during its life.

According to the present invention, a method is provided for controlling an operation of a blast furnace, which comprises the steps of:

storing first data output from sensor means provided in the blast furnace into a central processing unit (CPU);

processing said first data, thereby preparing second data showing the operating conditions in the blast furnace; and preparing true-and-false data, as the third data, by comparing said second data with standard data, and inferring a furnace operation condition, from the third data and a knowledge base formed by accumulated experience on the operation of the blast furnace.

BRIEF DESCRIPTION OF THE DRAWINGS

FIG. 2 is a schematic block representation of an apparatus for performing the method of the present invention;

DETAILED DESCRIPTION OF THE PREFERRED EMBODIMENT

An embodiment according to the present invention will now be described, with reference to FIGS. 1 to 4.

Figure 1:
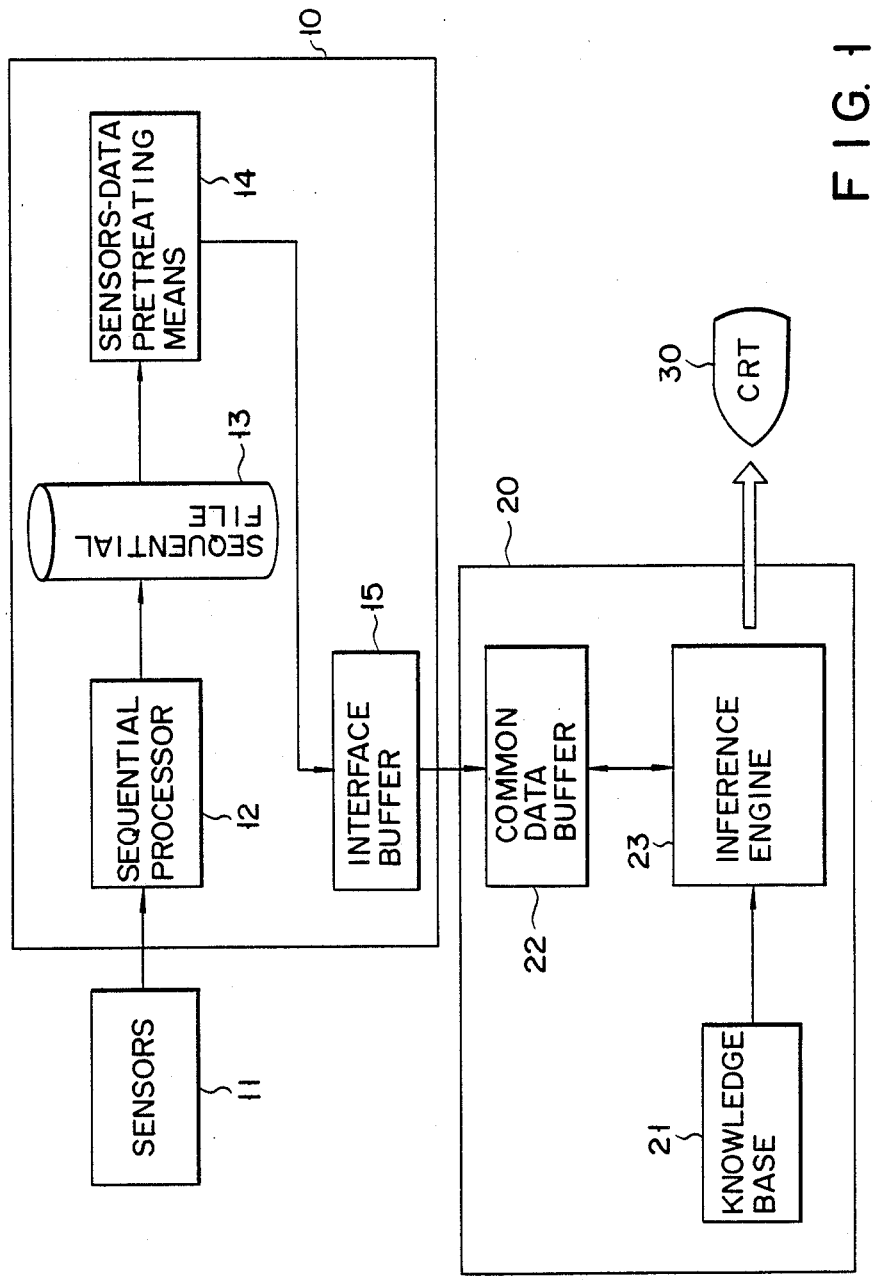
FIG. 1 is a schematic representation showing a method for diagnosing furnace operating conditions according to the present invention.
Figure 3:
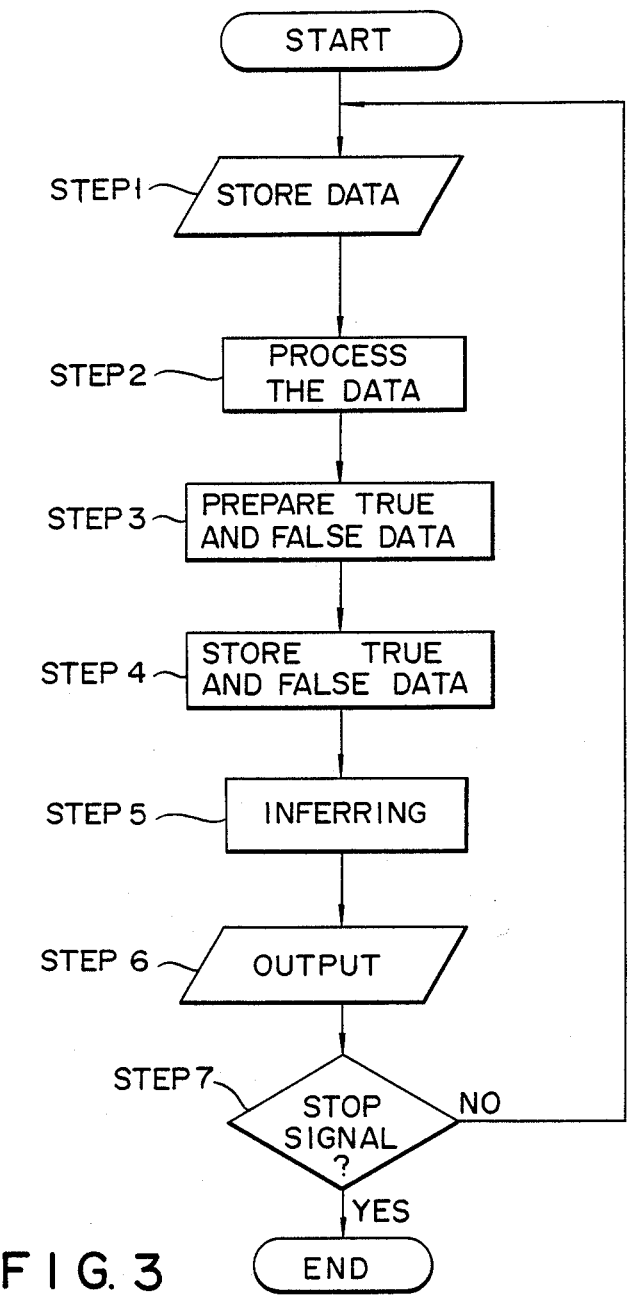
FIG. 3 is a flowchart showing the method of the present invention.

FIG. 1 schematically represents a method for diagnosing blast furnace operating conditions according to the present invention. Reference numeral 10 denotes a large-scale computer. Computer 10 includes sequential processing means 12, which sequentially processes the data output from various sensor means 11, sequential filing means 13, sensor-data processing means 14, and interface buffer means 15. Reference numeral 20 denotes a small-scale computer which includes knowledge base means 21 for diagnosing the operating conditions of a blast furnace, common data buffer means 22, and inference engine means 23. Reference numeral 30 denotes a cathode ray tube (CRT) which displays the results calculated by the inference engine means.

FIG. 2 schematically illustrates an apparatus for performing the method according to the present invention. Reference numerals 11a, 11b, and 11c each indicate sensors corresponding to sensor means 11 shown in FIG. 1. Large-scale computer 10 includes the following devices:

41: interface;
42: CPU;
43: read-only memory (ROM) storing program;
44 and 45: random access memories (RAMs); and
46: interface.

CPU 42 and ROM 43, which store the programs to be executed by CPU 42, constitute sequential processing means 12 and sensor-data processing means 14, both shown in FIG. 1. RAM 44 constitutes sequential filing means 13 shown in FIG. 1. RAM 45 temporarily stores the data output from the sensor means. RAM 45 and interface 46 constitute interface buffer means 15, shown in FIG. 1.

In FIG. 2, small-scale computer 20 includes keyboard 47, interface 48, CPU 49, ROM 50, RAMs 51 and 52, and interface 53. CPU 49 and ROM 50, which store the programs to be executed by CPU 49, constitute inference engine means 23 shown in FIG. 1. RAM 51 constitutes knowledge base means 21, also shown in FIG. 1. The data stored in RAM 51 can be altered by operating keyboard 47. New data can be added to these data by inputting the new data by keyboard 47 via interface 48. RAM 52 constitutes common data buffer means 22, as shown in FIG. 1. The data stored in RAM 45 of large-scale computer 10 are transferred to RAM 52 via interface 46. The results obtained by CPU 49 are supplied to CRT 30 through interface 53, and are displayed. The operation of the embodiment according to the present invention will now be described, in conjunction with the flowchart shown in FIG. 3.

(1) Firstly, the first data, output from sensor means 11, are read in a predetermined sequence by sequential processing means 12, and then stored in sequential filing means 13 (Step 1). Actually, this work is completed by supplying the data from sensors 11a, 11b, and 11c to RAM 44 through interface 41 under the control of CPU 42.

(2) The first data stored in sequential filing means 12 is processed by CPU 42, thereby forming second data showing furnace operating conditions. This processing step produces data showing a rate of change, comparison of levels, dispersion of values and an integral value of the first data within a designated time interval. This work is actually carried out by CPU 42 (Step 2).

(3) The second data obtained in Step 2 are compared by CPU 42 with standard data, thereby providing true-and-false data. The true-and-false data are stored in interface buffer means 15. More specifically, these data are stored in RAM 45 in FIG. 2 (Step 3).

(4) The true-and-false data stored in interface buffer means 15 are transferred to common data buffer means 22 (Step 4). More precisely, the stored data in RAM 45 are transferred to RAM 52.

(5) Inference engine means 23 infers the operating conditions of the furnace, based on the data stored in knowledge base means 21 and the true-and-false data stored in common data buffer means 24 (Step 5). This work is achieved as CPU 49 executes the program designated by the data stored in RAMs 51 and 52.

(6) Subsequently, the total judgement made by CPU 49 is supplied to CRT 30 through interface 53 and then displayed (Step 6).

(7) Then, it is determined whether a stop signal has been given or not. If YES, the processing is stopped. If NOT, it returns to Step 1. In the latter case, the aforementioned Steps 1-7 are repeated at predetermined intervals of, for example, 2 minutes.

Sensor means 11 detecting channeling and ship are largely classified into those for checking burden decent behavior, those for detecting pressure, those for detecting temperatures, and those for detecting gas compositions. In addition, residual slag data, obtained from information regarding pressure and temperature, also affect the channeling and slip. Table 1 shows the sensor means which detect the various conditions in the furnace.

TABLE 1

| Items | Sensor Means |
|---|---|
| A. Burden descent behavior | Stock line level soundings |
| B. Pressure | Top gas pressure guages |
| | Shaft pressure guages |
| | Blast pressure guages |
| C. Temperature | Top gas thermometers |
| | Under-bell probes at throat level |
| | Horizontal probes set in |
| | Shaft thermometers |
| | Blast thermometers |
| D. Gas constituent | Top gas analyzers |
| E & F. Residual slag | Under-bell probes at throat level |
| | Shaft pressure guages |
| | Blower pressure guages |

The sensor means are not limited to those listed in Table 1. In addition to those, a vertical probe, a differential type burden thickness and speed meter and a tuyere-nose-flame brightness measuring device can be used.

The step of processing the first data includes the following data-processings:

(a) Calculating the first regression coefficient for the past 30 minutes:

This is applicable to the temperature measured by horizontal probes, and top gas utilization ratio, and the temperature measured by under-bell probes.

(b) Calculating the balance between a value measured at present and that measured $t_k$ minutes before:

This is applicable to the shaft temperature.

(c) Calculating the balance between the two values obtained by the first regression coefficient formula by substitution of two values measured at present and $t_k$ minutes before:

This is applicable to the top gas utilization ratio.

(d) Calculating the balance between two values obtained at present and $t_k$ minutes before:

This is applicable to burden decent speed, pressure loss, shaft temperature, burden temperature at horizontal probe levels, shaft pressure and blast pressure.

(e) Calculating a standard deviation:

This is applicable to burden descent speed and pressure loss.

(f) Integrating a deviation from a theoretical value:

This is applicable to burden descent speed.

The second data, which have been pretreated, are shown in Table 2.

TABLE 2

| Block | | Pretreated Data (Second Data) |
|---|---|---|
| A. Burden descent behavior 200 | 201 | Burden descent speed |
| | 202 | Dispersion of burden descent speeds |
| | 203 | Delayed of burden descent |
| | 204 | Average of burden descent speeds |
| B. Pressure 201 | 211 | In-furnace pressure loss |
| | 212 | Average of in-furnace pressure losses |
| | 213 | Dispersion on in-furnace pressure losses |
| | 214 | Average of shaft pressures in stable operation |
| C. Temperature 220 | 221 | Rise of shaft temperature |
| | 222 | Average of shaft pressures in stable operation |
| | 223 | Rise of burden temperature measured by horizontal probes set in a shaft |
| | 224 | Average of burden temperatures in stable operation measured by the horizontal probes |
| D. Gas composition 230 | 231 | Fall of gas utilization ratio |
| | 232 | Amount of fall of gas utilization ratio |
| E. Residual slag (1) 240 | 241 | Fall of temperature at the in-furnace center part measured by under-bell probes set at a furnace throat level |
| | 242 | Rise of temperature at the in-furnace peripheral part measured by under-bell probes set at a furnace throat level |
| F. Residual slag (2) 250 | 251 | Rise of shaft pressure |
| | 252 | Rise of blast pressure |
| | 253 | Amount of residual slag |

The second data comprises:

Data 201 to 204 regarding burden descent behavior 200;

Data 211 to 214 regarding pressure 210;

Data 221 to 214 regarding temperature 220;

Data 231 and 232 regarding gas constituent 230;

Data 241 and 242 regarding residual slag (1) 240; and

Data 251 to 253 regarding residual slag (2) 250.

The items forming the second data are not limited to those described above. The residual slag (1) is affected by a burden distribution device, and the residual slag (2) is not affected by the same.

The second data are compared with the standard data to prepare true-and-false data. The standard data are composed of the average of those measured on a previous day, the average of those measured for an hour in stable operation, and a theoretical value.

In the case of burden descent behavior, for example, if the burden descent speed (a present moment value) minus burden descent speed (a previous day average value) is less than $-K_1$ (where $K_1$ is a constant) with respect to the four directions of sounding, the true-and-false data are "Burden descent speed is slow and a certain factor value is $CF_{201}$." Thus, the true-and-false data contain this certainty factor.

In the case of in-furnace pressure loss, if the "pressure loss (a present moment value) minus pressure loss (a previous day average value is larger than $K_2$ (where $K_2$ is a constant)", the true-and-false data are "Pressure loss is large and a certainty factor value is $CF_{211}$." The true-and-false data contain this certainty factor.

The items of true-and-false data, thus obtained, are listed in Table 3. The true-and-false data include, in addition to data corresponding to the second data, data 361, based on human judgement, "Residual slag is great", and data 371 based on a previous alarm, "The previous alarm is high", where a previous alarm is a total judgement made in the previous inference process.

TABLE 3

| | | The True-and-False Data (The Third Data) |
|---|---|---|
| A. Burden descent behavior 300 | 301 | Burden descent speed is slow |
| | 302 | Dispersion of burden descent speed is large |
| | 303 | Delay of burden descent is great |
| | 304 | Average of burden descent speeds is great |
| B. Pressure 310 | 311 | Pressure loss is large |
| | 312 | Average of pressure losses is large |
| | 313 | Dispersion of pressure losses is large |
| | 314 | Shaft pressure is high |
| C. Temperature 320 | 321 | Shaft temperature is rapidly rising |
| | 322 | Amount of shaft temperature rise is high |
| | 323 | Burden temperature measured by horizontal probes set in a shaft is rapidly rising |
| | 324 | Amount of burden temperature rise measured by the horizontal probes is large |
| D. Gas constituent 330 | 331 | Gas utilization ratio is rapidly falling |
| | 332 | Amount of gas utilization ratio is large |
| E. Residual slag (1) - sensor judgement 340 | 341 | Temperature of in-furnace central area measured by under-bell probes set at a furnace throat level is falling |
| | 342 | Temperature of in-furnace peripheral area measured by under-bell probes set at a furnace throat level is rising |
| F. Residual slag (2) - different sensor judgement 350 | 351 | Rise of shaft pressure is n or more |
| | 352 | Blast pressure is rapidly rising |
| | 353 | Residual slag is great |
| G. Residual slag (3) - human judgement 360 | 361 | Residual slag is great |
| H. Previous alarm 370 | 371 | The previous alarm is high |

The knowledge base is composed of knowledge units corresponding to the true-and-false data. Each knowledge unit indicates an operator's knowledge and experience on the operating production process, in the form of "if . . . , then . . . ". In this embodiment, the reliability of inference is raised by introducing to the inference process a certainty factor (CF) which indicates the uncertainty degree of each rule for the operating production process.

In the case of, for example, a rule for burden descent, the expression is: "If burden descent speed is slow, then, the operation has tendency toward channeling".

In the case of a rule for pressure loss, the expression is: "If pressure loss is large, then, the operation has a tendency toward channeling".

Figure 4:
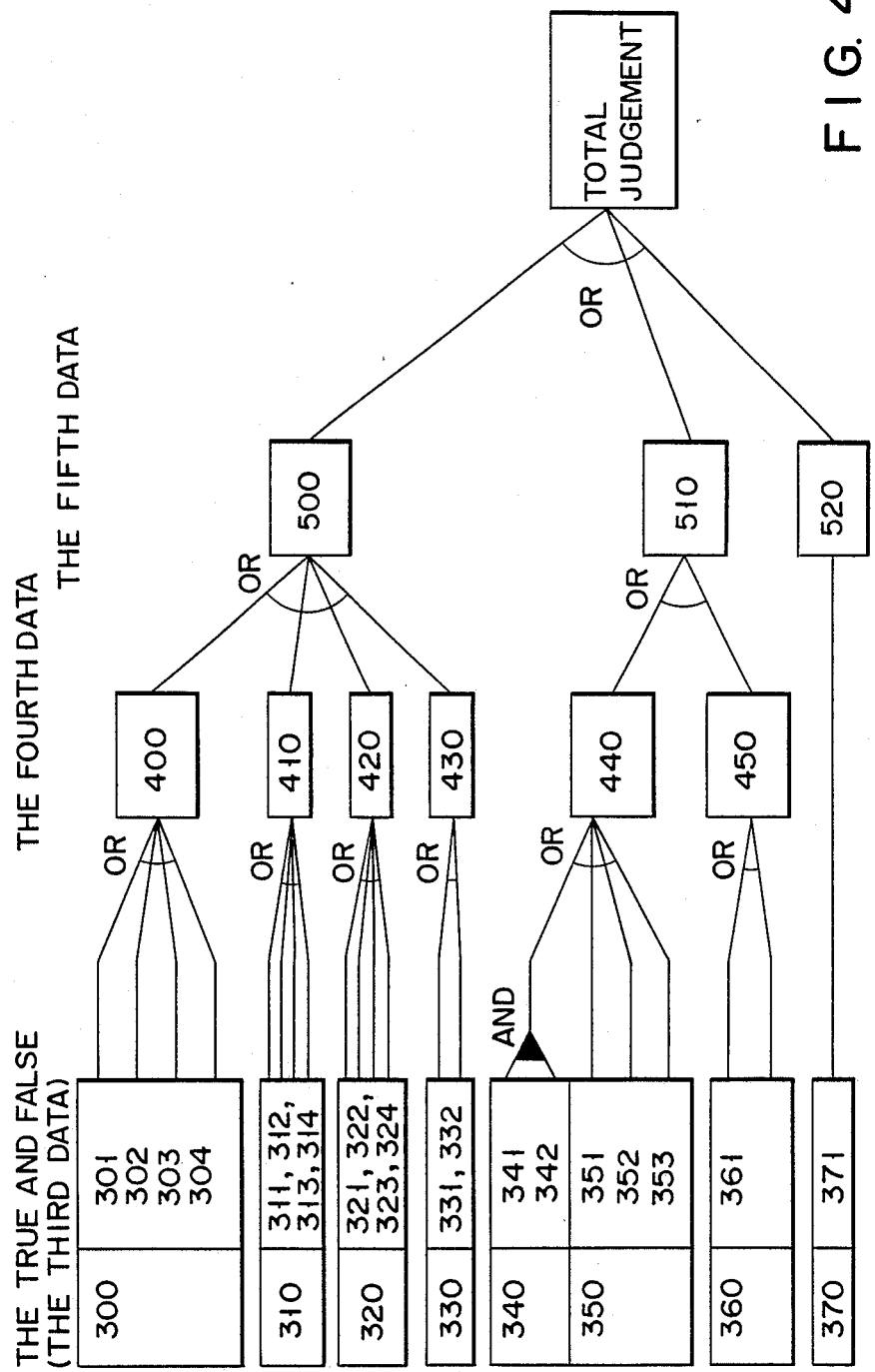
FIG. 4 is a schematic representation illustrating the processes of inferring operating conditions of a blast furnace according to the present invention.

An example of inference of judgement will now be given with reference to FIG. 4.

The processed results indicated by "OR" are the sum of the true-and-false data, into which CF values are taken, not a logical sum. The processed results indicated by "AND" are a logical product.

(1) The fourth data are obtained by inferences, based on the true-and-false data (the third data) and the knowledge base, and also based on CF values.

In the case of a burden descent rule, inference is performed, in combination with consideration of the CF values, on the basis of both the knowledge base, and the true-and-false data which are composed of:

"Burden descent speed is slow" (301);
"Dispersion of burden descent speed is large" (302);
"Delay of burden descent is large" (303);
"Average of burden descent speeds is slow" (304).

Thus, the inference results are a sum 400 of the items of data used in the inference process, i.e., the fourth data, which is accompanied by a CF value and which indicates: "Burden descent is out of successful operation".

In case of a pressure loss rule, inference is performed in the same manner corresponding CF values, on the basis of both the knowledge base and the true-and-false data of 311 to 314. thus, the inference results are a sum 410 of the items of data used in the inference, i.e., the fourth data, which is accompanied by a CF value summed, and which indicates "Pressure dispersion is large".

In the case of a temperature rule, the inference results, obtained from the true-and-false data of 321 to 324, are also a sum 420, or the fourth data. The fourth data are accompanied by a summed-up CF value and indicate: "Temperature dispersion is large".

In the case of a gas utilization rule, the inference results obtained from the true-and-false data of 331 and 332 are a sum 430, or the fourth data. The fourth data are accompanied by a summed-up CF value and indicate: "Gas utilization ratio is falling".

In the case of the inference regarding the amount of residual slag, based on sensor information (440) "Residual slag is great", which is processed by sensor judgement, a logical product is obtained from the following:

(1) "Temperature of in-furnace central area, measured by under-bell probes set at a furnace throat level, is falling" (341).

(2) "Temperature of in-furnace peripheral area, measured by under-bell probes set at a furnace throat level, is rising" (342).

If either of the two is false, the logical product is false. Except for this respect, the inference is performed in the same manner as described in the foregoing.

In the case of a residual slag rule other than the above-mentioned, the following true-and-false data are used:

(1) "Rise of shaft pressure is n or more" (351).

(2) "Blast-pressure is rapidly rising" (352).
(3) "Residual slag is great" (353).

Moreover, in some rules for residual slag, human judgement based on the operator's judgement is incorporated. From this processing, data 450, which constitutes the fourth data, is obtained. These data represent whether residual slag is great (450) (human judgement).

TABLE 4

| | |
|---|---|
| 400: | Burden descent behavior is out of successful operation |
| 410: | In-furnace pressure dispersion is large |
| 420: | In-furnace temperature dispersion is large |
| 430: | Gas utilization ratio is falling |
| 440: | Residual slag is great (based on sensor judgement) |
| 450: | Residual slag is great (based on human judgement) |

Among those rules for burden descent behavior, pressure loss, temperature, gas composition and residual slag, the burden descent behavior and the pressure rules affect most slips and channelings. There are three residual rules: the rule for residual slag (1), the rule for residual slag (2), and the rule for residual rule (3). This is because a single rule for residual slag (1) is insufficient when an operation of a burden distribution device is modified. Human judgement of residual slag (3) can be replaced by slag flow meter judgement.

(2) The fifth data are obtained on the basis of the fourth data.

An inference is performed, in consideration of the summed-up CF value accompanied by each of the results inferred in the fourth data-making process in respect to the burden descent behavior, pressure loss temperature and gas composition, on the basis of the following:

"Burden descent behavior is out of successful operation" (400);
"In-furnace pressure dispersion is large" (410);
"In-furnace temperature dispersion is large" (420);
"Gas utilization ratio is falling" (430).

Thus, the inference results, or a sum 500, i.e., the fifth data, is accompanied by a CF value and indicates: "Channeling (sensor judgement)" (500).

In the same manner, an inference is performed, in consideration of the sum of the CF values accompanied by the results inferred in the process of making the fourth data in respect to the rest of the items on the basis of the following:

"Residual slag is great (sensor judgement)" (440);
"Residual slag is great (human judgement)" (450).

Thus, the inference results or data 510, i.e., the fifth data, are accompanied by a CF value summed up in the inference process and indicates: "Channeling (residual slag)" (510).

TABLE 5

| | |
|---|---|
| 500: | Sensor judgement data |
| 510: | Residual slag judgement data |
| 530: | Previous alarm data |

(3) Total judgement is made on the basis of the fifth data.

Finally, an inference is performed, in consideration of the summed-up CF values accompanying the results inferred in the process of making the fifth data, on the basis of the following:

"Channeling (sensor judgement)" (500);
"Channeling (residual slag judgement)" (510);
"Channeling (previous alarm)" (520).

The inference results, or a sum of these items of data indicates "Channeling (total judgement)".

The embodiment explained above is for the diagnosis of channeling. Diagnosis of slip and hanging is made fundamentally in the same manner as the diagnosis of channeling, except that the CF values for slip and hanging are different from those for channeling.

In the embodiment, the certainty of foreseeing slip ($CF_f^s$) and the certainty of foreseeing channeling ($CF_f^c$) are obtained by carrying out inferences in three steps that is, the step of obtaining the fourth data from the true-and-false (third) data; the step of obtaining the fifth data from the fourth data; and the step of making the total judgement from the fifth data. This step-by-step inference gives the following advantages:

(1) Inference becomes speedy.
(2) Causes for slip and channeling are easy to clarify.
(3) CF values can be well maintained, even if modified.

The following substitutions can be employed in the invention:

(a) a method wherein a total judgement is inferred directly from the true-and-false (third) data;
(b) a method wherein a total judgement is inferred from the fifth data prepared directly on the basis of the true-and-false (third) data; and
(c) a method wherein a total judgement is made directly from the fourth data prepared on the basis of the true-and-false (third) data.

However, the method of inference described in the embodiment is more desirable, by reason of the aforementioned (1), (2), and (3), than the substitutions.

When a total judgement is made, the furnace is controlled in accordance with the results ($CF_f^s$, $CF_f^c$) of the judgement. The control is achieved by reducing the blast supplied through tuyeres, by changing the distribution of burden charged through a furnace top, by controlling the fuel ratio, by adjusting the composition of slag or, by increase or decrease of the temperature of the tuyere-nose flame. The reduction of the blast is effective, particularly for channeling.

The reduction of blast is standardized according to probabilities of slip. The reduction is set, for example, to 300 Nm³/min. (4 to 5% of total blast volume) when $CF_f^s$ is 60 to 80%, and to 500 Nm³/min. (7 to 8% of total blast amount) when $CF_f^s$ is greater than 80%.

EXAMPLE 1

Diagnosis of slip was carried out for a 4,663 m³-blast furnace on the operating conditions shown in Table 6. The diagnosis is made every 2nd minute. The results of the diagnosis at 12°10′ are shown in Table 7.

TABLE 6

| | |
|---|---|
| Blast volume | 6500 Nm³/min. |
| Blast pressure | 3.4 to 3.5 kg/cm |
| Gas temperature | 900° C. |
| Tuyere nose flame temperature | 2000° to 2100° C. |
| Fuel ratio | 514 kg/T · pig |
| Si contained in molten metal | 0.3 to 0.4% |
| S contained in molten metal | 0.02 to 0.025% |
| Molten metal temperature | 1480° to 1500° C. |

TABLE 7

| Inference reasons for slip | Probability |
|---|---|
| Burden descent behavior judgement | 22% |

TABLE 7-continued

| Inference reasons for slip | Probability |
| --- | --- |
| teaches tendency toward slip | |
| Pressure loss judgement teaches tendency toward slip | 13% |
| Temperature judgement teaches tendency toward slip | 22% |
| Possibility that residual slag is great is low | 0% |
| Sensor judgement: tendency toward slip | Aggregate 47% |
| Influence coefficient of previous alarm probability | 30% |
| Probability of slip in this operation | Aggregate 63% |

EXAMPLE 2

Figure 5:
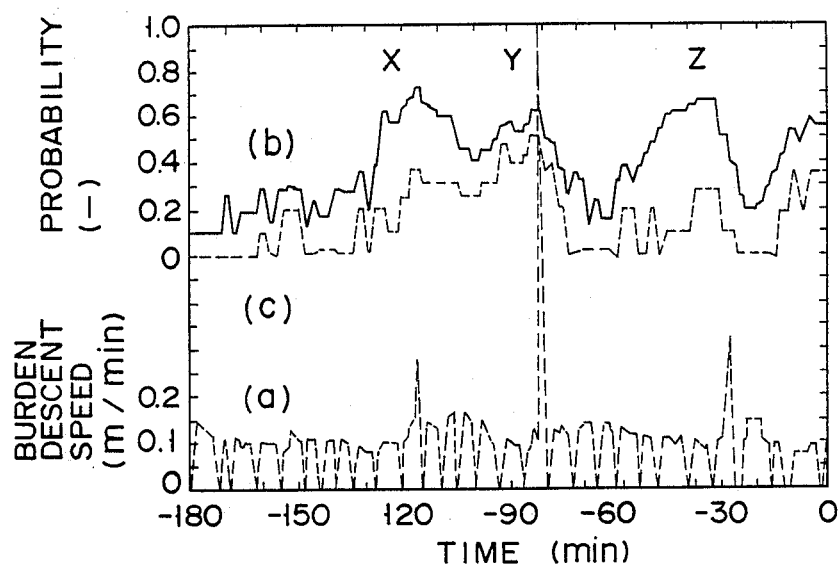
FIG. 5 is a graphic representation showing the results obtained by an example of the present invention.

Diagnosis of channeling was carried out every 2nd minute for 3 hours. the blast furnace was operated under the conditions shown in Table 6. The results are represented in FIG. 5, wherein (a) designates the burden descent behavior, (b) denotes the probability of slip ($CF_f^s$), and (c) represents the probability of channeling ($CF_f^c$)—all in relation to the lapse of time.

Remarkable increases of the burden descent speed occurred at points of X, Y, and Z where the probability of slip ($CF_f^s$) was high. This teaches that slips have occurred. Thus, a close relationship was proved to exist between $CF_f^s$ and slip occurrence.

EXAMPLE 5

The relationship between probability of slip ($CF_f^s$) and the conditions are the same as in the case of Example 1. The results of the diagnosis at 12°10′ are shown in Table 8.

TABLE 8

| Inference reasons for channeling | Probability |
| --- | --- |
| Burden descent behavior judgement teaches tendency toward channeling | 10% |
| Pressure loss judgement teaches tendency toward channeling | 8% |
| Temperature judgement teaches tendency toward channeling | 10% |
| Possibility that residual slag is great is low | 0% |
| Sensor judgement: tendency toward channeling | Aggregate 25% |
| Probability of channeling in this operation | Total aggregate 25% |

EXAMPLE 3

Figure 6:
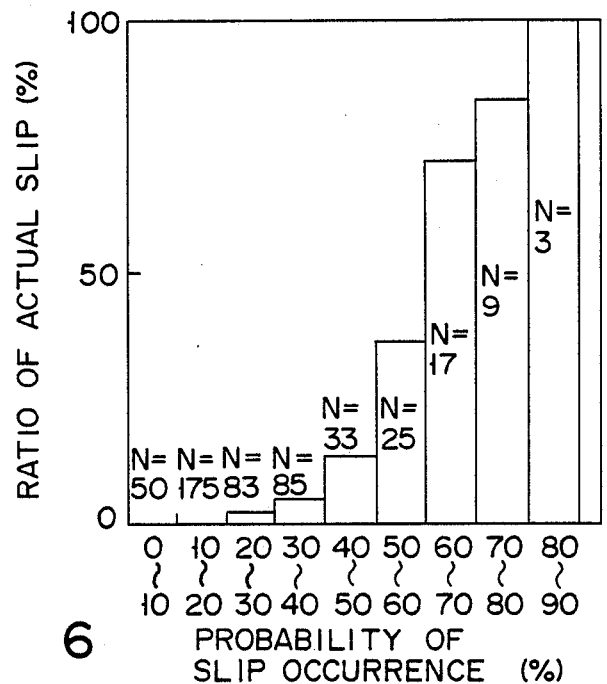
FIG. 6 is a graphic representation showing the relationship between the diagnosis results of an example obtained by the present invention and the actual operating conditions.

Diagnosis of slip and channeling was carried out. The actual slip occurrence ratio is shown in FIG. 6.

The data-sampling period was 10 days. The actual slip ratio is given by formula of N/F, where N is the number of highest $CF_f^s$ levels obtained during the 10-day period, and F is the number of slips occurring during the same period. Each of these levels is highest of the fifteen levels detected within thirty minutes. They were counted at a ten-percent pitch.

When $CF_f^s$ was greater than 60%, it was ascertained that slips occurred with a probability of greater than 70%.

What is claimed is:

1. A method for preventing channeling, slip and hanging in a blast furnace, comprising the steps of:
   measuring a burden-descent speed by a first sensor means;
   measuring an in-furnace pressure by a second sensor means;
   measuring a burden temperature by a third sensor means;
   measuring an in-furnace gas temperature by a fourth sensor means;
   measuring a composition of an in-furnace gas by a fifth sensor means;
   measuring a pressure of a blast gas blown in through tuyeres set in the blast furnace by a sixth sensor means;
   storing first data from the first to sixth sensor means;
   processing said first data, and preparing second data corresponding to the conditions of the channeling, slip and hanging in the blast furnace;
   preparing true-and-false data, as third data, by comparing said second data with standard data;
   inferring conditions of channeling, slip and hanging, from the third data and from a knowledge base formed by accumulated experience on an operation of the blast furnace; and
   repeating the above-mentioned steps at predetermined intervals.

2. The method according to claim 1, wherein said predetermined intervals are about two minutes.

3. A method according to claim 1, wherein said step of inferring comprises a step of processing the true-and-false data, in consideration of a CF value corresponding to an individual item of the true-and-false data, to prepare a total judgement datum.

4. A method according to claim 1, wherein said step of processing the first data includes at least one selected from the following processings:
   calculating a rate of change within a designated time interval;
   calculating an integral value within a designated time interval;
   calculating dispersion of values within a designated time interval; and
   calculating a balance between a value measured at a present time and a value measured before.

5. A method according to claim 1, wherein said second data includes at least one selected from the following:
   data representing burden-descent behavior;
   data representing in-furnace pressure loss;
   data representing in-furnace temperature;
   data representing composition of in-furnace gas; and
   data representing residual slag.

6. A method according to claim 5, wherein said data representing burden descent behavior includes at least one selected from the following:
   burden-descent speed;
   dispersion of burden-descent speed;
   delay of burden-descent; and
   average of burden-descent speeds.

7. A method according to claim 5, wherein said data representing in-furnace pressure loss includes at least one selected from the following:
   in-furnace pressure loss;
   average of in-furnace pressure losses;
   dispersion of in-furnace pressure losses; and
   average of shaft pressures in stable operation.

8. A method according to claim 5, wherein said data representing in-furnace temperature includes at least one selected from the following:
   rise of shaft temperature;
   average of shaft temperatures in stable operation;

rise of burden temperature, measured by horizontal probes set in a shaft; and average of burden temperatures in stable operation, measured by the horizontal probes.

9. A method according to claim 5, wherein said data representing gas composition includes at least one of a drop of a gas utilization ratio and the drop of gas utilization amount.

10. A method according to claim 5, wherein said data representing residual slag includes at least one selected from the following:

a fall of temperature of the in-furnace central area at a furnace-throat level, measured by under-bell probes;

a rise of in-furnace temperature of the periphery area at a furnace-throat level, measured by under-bell probes;

a rise of shaft pressure;

a rise of blast pressure; and an amount of residual slag.

11. A method according to claim 1, wherein said knowledge base comprises at least one selected from the following:

a rule for burden-descent;

a rule for in-furnace pressure loss;

a rule for in-furnace temperature;

a rule for in-furnace gas constituent; and a rule for residual slag.

12. A method according to claim 1, wherein said step of inferring comprises the steps of:

producing true-and-false data, in consideration of a certainty factor (CF) value corresponding to an individual item of the true-and-false data, to prepare at least one item of data constituting fourth data, selected from the following:

data showing levels of burden descent;

data showing levels of in-furnace pressure dispersion;

data showing levels of in-furnace temperature dispersion;

data showing levels of gas utilization ratio;

data showing levels of amount of residual slag by sensor judgement; and data showing levels of amount of residual slag by human judgement;

processing said fourth data, in consideration of a CF value corresponding to an individual item of said fourth data, to prepare fifth data including data obtained by sensor judgement and data obtained by human judgement; and processing said fifth data and a datum of a previous alarm, in consideration of a CF value corresponding to an individual item of the fifth data, to prepare a total judgement datum.

13. A method according to claim 1, wherein said step of inferring comprises the steps of:

processing the true-and-false data, in consideration of a CF value corresponding to an individual datum of the true-and-false data, to prepare at least one item of data constituting fourth data, selected from the following:

data showing levels of burden descent;

data showing level of in-furnace pressure dispersion;

data showing levels of in-furnace temperature dispersion;

data showing levels of gas utilization ratio;

data showing levels of amount of residual slag by sensor judgement; and data showing levels of residual slag by human judgement;

processing said fourth data and a datum of a previous alarm, in consideration of a CF value corresponding to an individual item of said fourth data, to prepare a total judgement datum.

14. A method according to claim 1, which further comprises the step of controlling an operating condition of the blast furnace in accordance with results of the inferring step.

15. A method according to claim 14, wherein said step of controlling an operating condition of the blast furnace comprises reducing a blast blown into the blast furnace through tuyeres set in the blast furnace.

* * * * *